Patented June 11, 1929.  1,717,009

UNITED STATES PATENT OFFICE.

ALEX BROOKING DAVIS, OF CINCINNATI, OHIO, ASSIGNOR TO PENNSYLVANIA COAL PRODUCTS CO., OF PETROLIA, PENNSYLVANIA, A CORPORATION OF PENNSYLVANIA.

PROCESS FOR PURIFYING ALPHA NAPHTHOL.

No Drawing.    Application filed March 15, 1926.  Serial No. 94,719.

This invention relates to the manufacture of alpha naphthol, and more particularly relates to the production and recovery of pure alpha naphthol from crude alpha naphthol produced by the fusion process from naphthalene alpha sulphonic acid.

Alpha naphthol is a well-known intermediate in the manufacture of many dyestuffs, and for this purpose its purity is a necessary essential when the product is used in the manufacture of colors where purity of shade and high solubility are desired.

Of the several processes known for its production, two are most widely used in manufacturing the material in quantity. One of these consists in treating alpha naphthylamine in an autoclave with salts or acids or both of such a nature that they will split off the amino group, replacing it with a hydroxyl group, thereby converting the naphthylamine into naphthol. Alpha naphthol is made by this process of a high degree of purity, but the autoclaves used in the process are expensive, of short life, and their output in proportion to their cost and labor involved is low. The other commercial process consists of fusing an alkali salt of naphthalene alpha sulphonic acid with an excess of a caustic alkali, and isolating the resulting naphthol from the fusion. This process is impractical for many purposes, for the resulting alpha naphthol contains as an impurity about 20% of beta naphthol due to the fact that in manufacturing naphthalene alpha sulphonic acid an appreciable quantity of the beta sulphonic acid is always produced, and this individually is converted into beta naphthol which comes out as an impurity in the alpha product.

It is recognized that the fusion process is cheaper than the method of manufacturing alpha naphthol from alpha naphthylamine, provided a product of approximately equal purity could be obtained, but so far as I am aware no practical method of separating the beta naphthol from the alpha has so far been devised, and the object of this invention is to provide a commercially inexpensive and practical method for carrying out this operation, and to obtain a high yield of alpha naphthol of a high degree of purity. Other objects of my invention will be in part obvious and in part pointed out hereinafter.

The commercial method of fusing the sodium salt of naphthalene alpha sulphonic acid with caustic soda, and isolating the crude alpha naphthol containing upwards to 20% of beta naphthol as an impurity, is well known, and needs no further comment. My invention involves the separation of the beta naphthol which exists here as a contamination. I have found that while alpha naphthol dissolves calcium hydroxide to form an unstable but easily soluble calcium salt, beta naphthol on the contrary, under similar conditions, and when the concentrations are correct, yields an almost insoluble calcium salt which may be easily removed from the solution of the alpha calcium salt, thereby affording a ready method of separation, and when the resulting solution of purified alpha naphthol calcium salt is acidified with an acid whose calcium salt is soluble, the alpha naphthol is precipitated therefrom, and upon distilling yields a product so pure as to be suitable for practically all commercial purposes. In detail my process may be carried out as follows:

In a tub of 500 gallon capacity, there is placed 113 gallons of water and 144 pounds of crude naphthol (alpha containing 15-20% of beta). To this mass, there is added 90 pounds of high grade commercial hydrated lime, which has been slacked in the minimum quantity of water to give a thin cream (about 15 gallons). The mass is now brought to the boiling point with live steam, and let boil for about 15 minutes. It is then allowed to cool to 20-25 degrees C., either by standing over night or with a cooling coil which encircles the outer periphery of the tub. When this temperature has been reached, the mass is pumped through a filter press and the filtrate, consisting almost entirely of the calcium salt of alpha naphthol, is allowed to run into another 500 gallon tub. The press cake left in the filter press, which consists of the calcium salt of beta naphthol, is dumped into a bin and held to be worked with larger lots of the same material.

The filtrate from the filter press, which carries practically all the alpha napthol, is now accurately acidified with hydrochloric acid—18 degrees Bé. commercial material should be used, and the amount added is just sufficient to make the whole mass faintly acid to Congo. The quantity required will be about 225 pounds. The precipitated alpha naphthol is now filtered off in a filter press, and the filtrate consisting principally of dilute calcium chloride solution allowed to run to waste. The alpha naphthol press cake is carefully washed in the press, melted in a steam-jacketed kettle, the supernatant water run off and then distilled directly, when it yields a product solidifying sharply at about 90 degrees C., and with careful working may melt at 93–94 degrees, practically the theoretical melting point of pure alpha naphthol, satisfactory for almost every purpose for which alpha naphthol is used.

Since the calcium salt of beta naphthol is insoluble, it is obvious that with proper concentration and manipulation of the process other alkali earths or alkali earth metal hydroxides than calcium will yield an insoluble beta naphthol salt which would enable the process to be worked in an exactly similar manner therewith, and I do not restrict myself to calcium hydroxide as the sole material which may be used in carrying out this operation. Numerous operations carried out by me show that by carefully handling this process alpha naphthol of a purity in excess of 98% may be obtained, and 99% and better is to be expected in the regular run in a plant properly equipped for carrying out this process detail.

As many changes could be made in carrying out the above process without departing from the scope of the invention, it is intended that all matter contained in the above description shall be interpreted as illustrative and not in a limiting sense.

Now, having described my process, what I claim is:

1. The process of manufacturing pure alpha naphthol from naphthol containing both alpha naphthol and beta naphthol, which includes subjecting the naphthol to the action of an alkali earth substance which forms with the alpha component a relatively soluble product and which forms with the beta component a relatively insoluble product, and recovering the alpha component from the relatively soluble product.

2. The process of manufacturing pure alpha naphthol from naphthol containing both alpha naphthol and beta naphthol, which includes subjecting the naphthol to the action of calcium hydroxide, which forms with the alpha component a relatively soluble product and which forms with the beta component a relatively insoluble product, and recovering the alpha component from the relatively soluble product.

3. The process of manufacturing pure alpha naphthol from naphthol containing both alpha naphthol and beta naphthol, which includes subjecting the naphthol to the action of an alkali earth metal hydroxide to form with the alpha component a relatively soluble salt and to form with the beta component a relatively insoluble salt, separating the soluble salt from the relatively insoluble salt, and recovering the alpha component from the soluble salt.

4. The process of manufacturing pure alpha naphthol from naphthol containing both alpha naphthol and beta naphthol, which includes subjecting the naphthol to the action of an alkali earth metal hydroxide to form with the alpha component a relatively soluble salt and to form with the beta component a relatively insoluble salt, separating the soluble salt from the relatively insoluble salt, and recovering the alpha component from the soluble salt by reacting said salt with an acid to precipitate the alpha naphthol therefrom.

5. The process of manufacturing pure alpha naphthol from naphthol containing both alpha naphthol and beta naphthol, which includes subjecting the naphthol to the action of calcium hydroxide to form with the alpha component a relatively soluble calcium salt and to form with the beta component a relatively insoluble calcium salt, separating the soluble calcium salt from the relatively insoluble calcium salt and acidifying the alpha naphthol calcium salt with an acid capable of forming a soluble calcium salt to precipitate the alpha naphthol therefrom.

6. The process of manufacturing pure alpha naphthol from naphthol containing both alpha naphthol and beta naphthol, which includes subjecting the naphthol to the action of calcium hydroxide to form with the alpha component a relatively soluble calcium salt and to form with the beta component a relatively insoluble calcium salt, separating the soluble calcium salt from the relatively insoluble calcium salt, acidifying the alpha naphthol calcium salt with an acid capable of forming a soluble calcium salt to precipitate the alpha naphthol therefrom, and recovering the precipitated alpha naphthol by distillation.

7. The process of the character described which includes adding hydrated lime to water-diluted naphthol containing both alpha and beta naphthol, boiling the mass, thereafter allowing the mass to cool, filtering the same, and acidifying the filtrate to precipitate alpha naphthol.

This specification signed this 10th day of March, 1926.

ALEX BROOKING DAVIS.